United States Patent
Washino et al.

(10) Patent No.: US 12,491,939 B2
(45) Date of Patent: Dec. 9, 2025

(54) VEHICLE STEERING SUPPORT DEVICE

(71) Applicant: TOYOTA JIDOSHA KABUSHIKI KAISHA, Toyota (JP)

(72) Inventors: Shigeru Washino, Toyota (JP); Shoichiroh Morioka, Iwakura (JP); Hiroaki Kataoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 194 days.

(21) Appl. No.: 18/392,603

(22) Filed: Dec. 21, 2023

(65) Prior Publication Data
US 2024/0308581 A1 Sep. 19, 2024

(30) Foreign Application Priority Data
Mar. 16, 2023 (JP) .................... 2023-041875

(51) Int. Cl.
*B62D 6/10* (2006.01)
*B62D 5/04* (2006.01)

(52) U.S. Cl.
CPC ............ *B62D 6/10* (2013.01); *B62D 5/04* (2013.01)

(58) Field of Classification Search
CPC . B62D 6/10; B62D 5/04; B62D 5/049; B62D 6/00; B62D 5/046
See application file for complete search history.

(56) References Cited

U.S. PATENT DOCUMENTS

| | | | |
|---|---|---|---|
| 8,909,428 B1 * | 12/2014 | Lombrozo | B62D 1/04 701/41 |
| 9,805,275 B2 | 10/2017 | Okuda | |
| 10,525,981 B2 | 1/2020 | Matsumura | |
| 10,579,056 B2 | 3/2020 | Matsumura | |
| 10,649,452 B2 | 5/2020 | Ichikawa et al. | |
| 10,706,299 B2 | 7/2020 | Matsumura | |
| 10,814,880 B2 | 10/2020 | Kishi | |
| 10,895,875 B2 | 1/2021 | Hashimoto et al. | |
| 10,915,100 B2 | 2/2021 | Matsushita et al. | |
| 11,173,919 B2 | 11/2021 | De Weser et al. | |
| 2012/0041645 A1 * | 2/2012 | Benyo | B62D 5/0466 701/42 |
| 2018/0087929 A1 * | 3/2018 | Matsumura | G01D 5/24 |
| 2018/0172528 A1 * | 6/2018 | Kim | B60W 40/08 |
| 2019/0331544 A1 * | 10/2019 | Kojo | G01L 5/221 |

(Continued)

FOREIGN PATENT DOCUMENTS

| | | |
|---|---|---|
| JP | 2020-117025 A | 8/2020 |
| JP | 2021-091255 A | 6/2021 |

*Primary Examiner* — Sizo B Vilakazi
(74) *Attorney, Agent, or Firm* — SoraIP, Inc.

(57) ABSTRACT

A steering support device including: a torque applying device configured to apply control torque to a steering transmission system between a steering wheel and a steered wheel; a steering torque sensor provided in the steering transmission system between the steering wheel and the torque applying device; and a control unit configured to determine that the driver is not holding the steering wheel when the torque Ts detected by the steering torque sensor is less than the reference value Tsc. The control unit sets a reference value Tsc to a larger value when determining that torque is input to the steering torque sensor from the steered wheel side than when determining that torque is input to the steering torque sensor from the steering wheel side.

5 Claims, 7 Drawing Sheets

(56) References Cited

U.S. PATENT DOCUMENTS

| | | | |
|---|---|---|---|
| 2020/0353978 A1* | 11/2020 | Hwang | B60W 50/08 |
| 2022/0274643 A1 | 9/2022 | Fujimoto et al. | |
| 2024/0278833 A1* | 8/2024 | Farooqi | G01L 3/00 |
| 2025/0058828 A1* | 2/2025 | Shoji | B62D 15/024 |

* cited by examiner

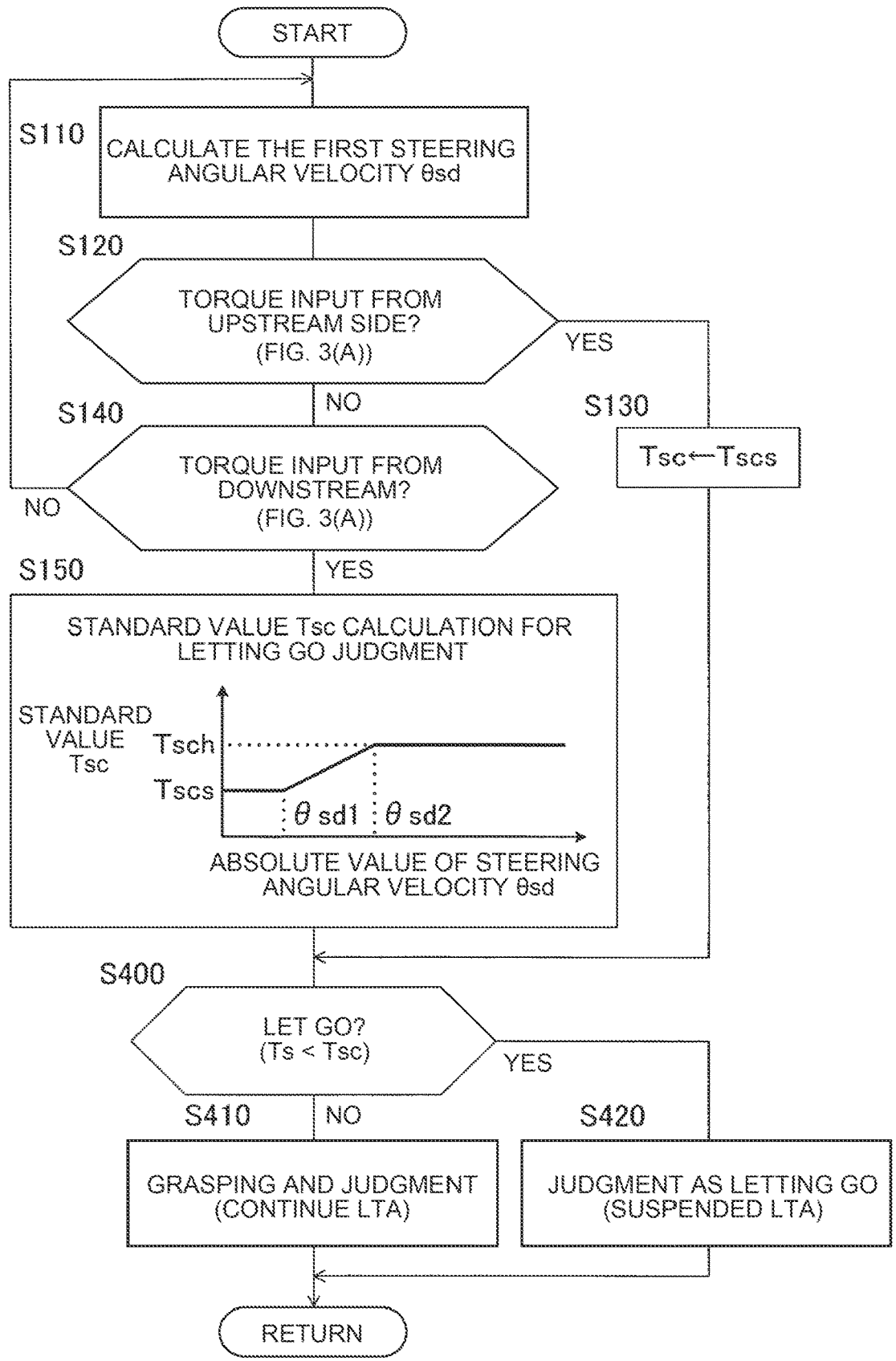

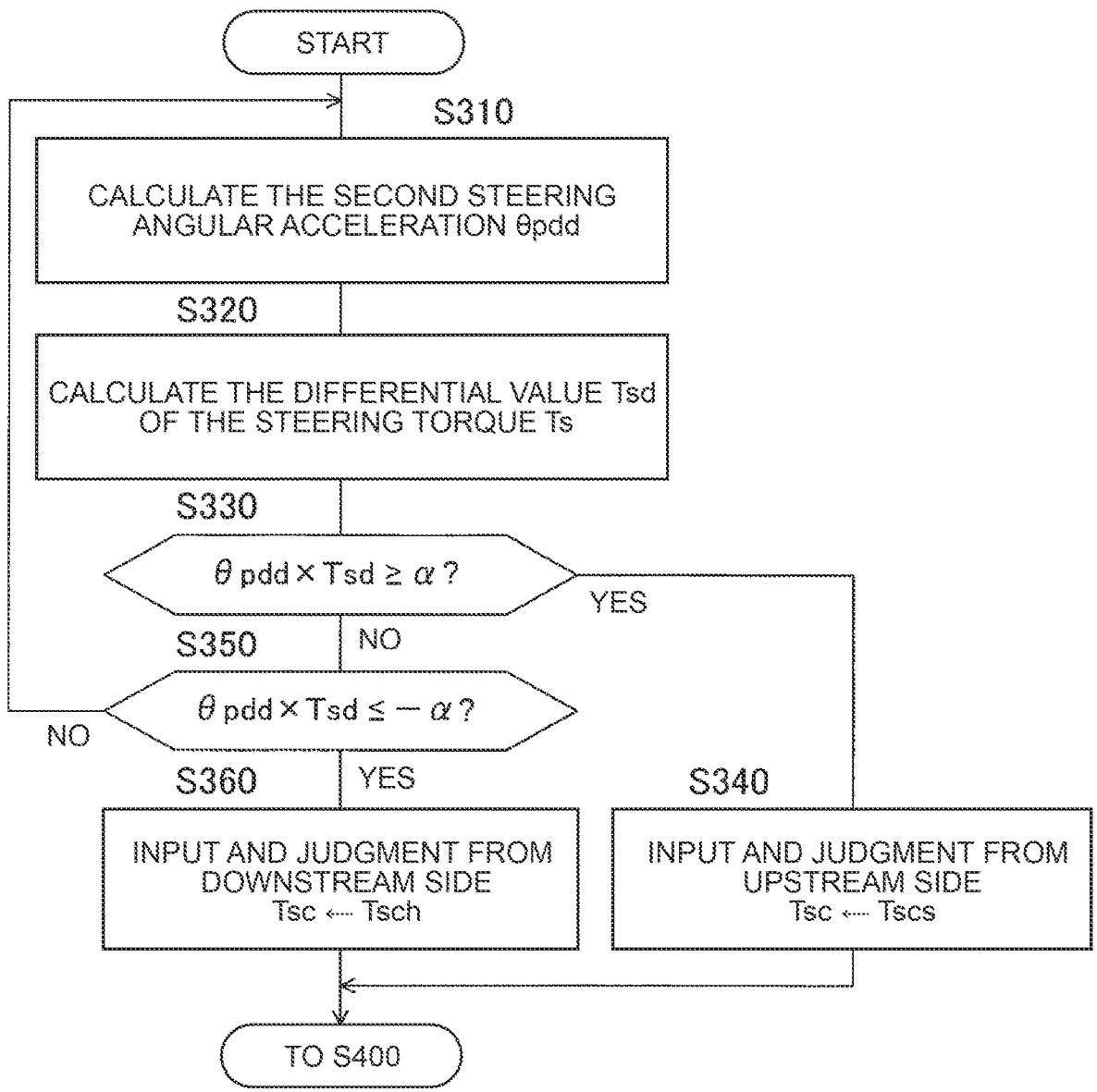

VEHICLE STEERING SUPPORT DEVICE

CROSS-REFERENCE TO RELATED APPLICATION

This application claims priority to Japanese Patent Application No. 2023-041875 filed on Mar. 16, 2023, incorporated herein by reference in its entirety.

BACKGROUND

1. Technical Field

The present disclosure relates to a steering support device for a vehicle such as an automobile.

2. Description of Related Art

As a driving support device for a vehicle such as an automobile, a steering support device that controls the lateral position of a vehicle with respect to a lane by automatic steering is well known. This type of steering support device includes a lane keeping support device, a lane departure suppression device, a lane change support device, and the like.

When the steering support device provides steering support, a driver is required to grip a steering wheel. When the driver is not gripping the steering wheel, a situation where the steering torque is small continues. Therefore, it is known that it is determined, based on the steering torque detected by a steering torque sensor, whether the driver is not gripping the steering wheel and is releasing the hand from the steering wheel. For example, Japanese Unexamined Patent Application Publication No. 2020-117025 (JP 2020-117025 A) describes a hand-free determination technique. In this technique, when determination in which the steering torque detected by the steering torque sensor is less than a reference value is repeated a predetermined number of times, it is determined that the driver releases the hand from the steering wheel. According to the hand-free determination technique, the driver's hand-free state can be detected without requiring an expensive sensor such as a touch sensor.

SUMMARY

In order to suppress the driver's hand-free state from being overlooked, a reference value needs to be set to a large value. However, when the reference value is set to a large value, it is likely to be erroneously determined that the driver is in a hand-free state even though the driver is gripping the steering wheel. Conversely, when the reference value is set to a small value, it is likely to be erroneously determined that the driver is not in a hand-free state even though the driver releases the hand from the steering wheel.

For example, the steering support device includes a torque applying device such as an electric power steering device. The torque applying device is configured to apply control torque for steering and driving the steered wheel to a steering transmission system between the steering wheel and the steered wheel on a side closer to the steered wheel side than the steering torque sensor is. Automatic steering in the steering support device is performed by applying control torque to the steering transmission system by the torque applying device. Therefore, even when the driver is in a hand-free state, the steering torque momentarily becomes equal to or more than the reference value due to the control torque, and it may not be possible to detect the driver's hand-free state. A similar situation occurs when torque is input from the steered wheel to the steering transmission system due to road surface disturbance.

The present disclosure provides a steering support device that is improved so as to reduce the possibility in which determination of whether the driver is in a hand-free state is erroneous, by changing the magnitude of the reference value depending on whether the torque input to the steering torque sensor is from the steered wheel side.

According to the present disclosure, a steering support device includes a torque applying device, a steering torque sensor, and a control unit.

The torque applying device (EPS device 12) is configured to apply control torque to a steering transmission system (34) between a steering wheel (14) and a steered wheel (front wheels 16FL, 16FR).

The steering torque sensor (38) is provided in the steering transmission system between the steering wheel and the torque applying device.

The control unit (steering support ECU 50) is configured to determine that a driver is not gripping the steering wheel when torque (Ts) detected by the steering torque sensor is less than a reference value (Tsc) (S400) (S420).

The control unit is configured to set the reference value to a larger value (S150, S300, S360) when determination is made that the torque is input to the steering torque sensor from the steered wheel side (S140) than when determination is made that the torque is input to the steering torque sensor from the steering wheel side (S120).

During automatic steering in which control torque is applied to the steering transmission system by the torque applying device, and during torque input due to road surface disturbance, in other words, when torque is input from the steered wheel side to the steering torque sensor, the steering torque may momentarily increase even when the driver is in a hand-free state. Therefore, in order to suppress the erroneous determination in which the driver is not in a hand-free state, the reference value needs to be set to a large value. However, when torque is input to the steering torque sensor from the steering wheel side, and the reference value is set to a large value, even though the driver is gripping the steering wheel, it is likely to erroneously determine that the driver is in a hand-free state. Therefore, it is necessary that the reference value is not set to a large value.

According to the above configuration, the reference value is set to be a larger value when it is determined that the torque is input to the steering torque sensor from the steered wheel side than when it is determined that the torque is input to the steering torque sensor from the steering wheel side. Therefore, in a situation where the torque is input from the steered wheel side, the possibility of erroneously determining that the driver is not in a hand-free state is reduced. Furthermore, in a situation where the torque is input from the steering wheel side, it is possible to reduce the possibility of erroneously determining that the driver is in a hand-free state.

In one aspect of the disclosure, the steering support device (100) includes a steering angle detection device (steering angle sensor 36, rotary encoder 28A) configured to detect a steering angle by detecting a rotation angle of a member of the steering transmission system, and the control unit (steering support ECU 50) is configured to determine, based on a relationship between a direction of change in the steering angle ($\theta s$, $\theta p$) detected by the steering angle detection device and a direction of torque (Ts) detected by the steering torque sensor (FIGS. 3A and 3B), whether the torque is input to the steering torque sensor from the steered wheel side (S140).

In another aspect of the present disclosure, the steering support device (100) includes a first steering angle detection device (steering angle sensor 36) that detects a steering angle between the steering wheel and the steering torque sensor, and a second steering angle detection device (rotary encoder 28A) that detects a steering angle between the steered wheel and the steering torque sensor, and the control unit (steering support ECU 50) is configured to determine, based on a relationship between a direction of change in the steering angle ($\theta s$) detected by the first steering angle detection device and a direction of change in the steering angle ($\theta p$) detected by the second steering angle detection device (FIGS. 4A and 4B), whether the torque is input to the steering torque sensor from the steered wheel side (S290).

In another aspect of the present disclosure, the steering support device (100) includes a steering angle detection device (steering angle sensor 36, rotary encoder 28A) configured to detect a steering angle by detecting a rotation angle of a member with one rotation direction of the member of the steering transmission system being positive, the steering torque sensor (38) is configured to detect torque with torque in one relative rotation direction being positive, and the control unit (steering support ECU 50) is configured to determine, based on a product sign of a second-order differential value of the steering angle ($\theta sdd$, $\theta pdd$) detected by the steering angle detection device and a differential value of the torque (Tsd) detected by the steering torque sensor (FIGS. 6A and 6B), whether the torque is input to the steering torque sensor from the steered wheel side (S350).

In another aspect of the present disclosure, the torque applying device (EPS device 12) includes an electric motor (28) equipped with a rotary encoder (28A), and the steering angle detection device is configured to detect a steering angle using an output of the rotary encoder.

Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart showing a hand-holding determination control routine of the first embodiment;

FIG. 7 is a flowchart showing a main part of a hand-off determination control routine according to the third embodiment.

DETAILED DESCRIPTION OF EMBODIMENTS

Embodiments of the present disclosure will be described in detail below with reference to the accompanying drawings.

Figure 1:
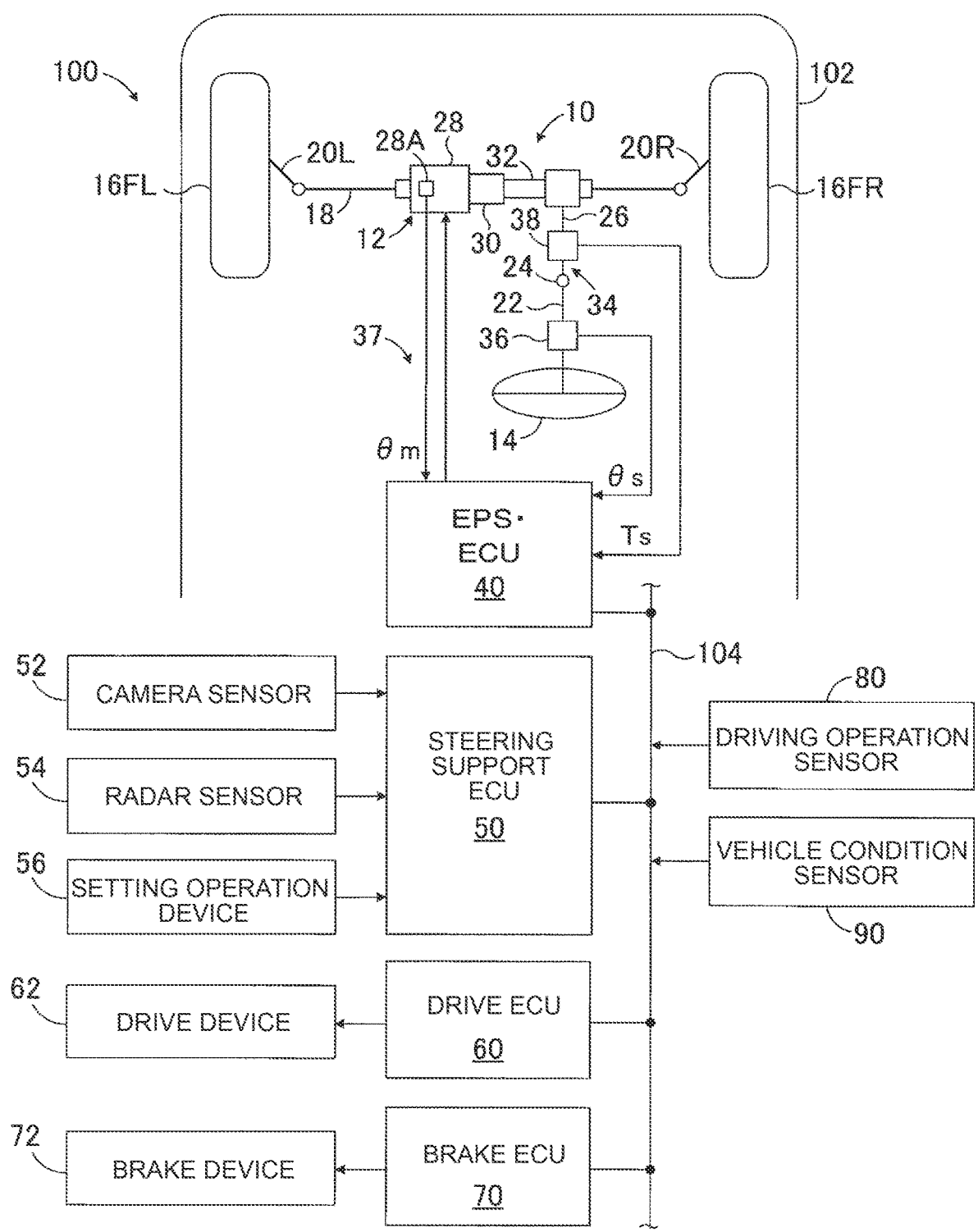
FIG. 1 is a schematic configuration diagram showing a steering support device according to an embodiment.

The steering support device 100 according to the embodiment is applied to a vehicle 102 that includes a steering device 10, an electric power steering· ECU 40, a steering support ECU 50, a drive ECU 60, and a brake ECU 70, as shown in FIG. 1. In this specification, electric power steering is referred to as "Electric Power Steering" when necessary.

The EPS·ECU 40, the steering support ECU 50, the drive ECU 60, and the brake ECU 70 are electronic control units (ECUs) that include a microcomputer as a main part, and are connected to be able to mutually send and receive information via the Controller Area Network (CAN) 104. Each of the microcomputers includes a central processing unit (CPU), a read-only memory (ROM), a random access memory (RAM), a non-volatile memory, an interface, and the like. The CPU realizes various functions by executing instructions (programs, routines) stored in the ROM. These ECUs may be integrated into one ECU.

As shown in FIG. 1, the steering device 10 includes an EPS device 12 connected to an EPS·ECU 40, and the EPS device 12 is a configured as a rack and pinion type EPS device that is driven in response to the operation of a steering wheel 14 by the driver. The rack bar 18 of the EPS device 12 is connected to knuckle arms (not shown) of front wheels 16FL and 16FR, which are steered wheels, via tie rods 20L and 20R. The steering wheel 14 is connected to a pinion shaft 26 of the EPS device 12 via a steering shaft 22 and a universal joint 24.

In the illustrated embodiment, the EPS device 12 is a rack-assist electric power steering device. The EPS device 12 includes an electric motor 28 and a belt-type conversion mechanism 30, for example. The conversion mechanism 30 converts the rotation and torque of the electric motor 28 into displacement and force in the reciprocating direction and transmits them to the rack bar 18. The EPS device 12 generates a control torque by driving the rack bar 18 relative to the housing 32.

Therefore, the steering shaft 22, universal joint 24, pinion shaft 26, EPS device 12, and tie rods 20L and 20R constitute a steering transmission system 34 between the steering wheel 14 and the front wheels 16FL and 16FR. The steering transmission system 3 transmits steering displacement and torque. The EPS device 12 functions as a torque applying device that applies control torque to the steering transmission system 34.

The steering shaft 22 is provided with a steering angle sensor 36 that detects the steering angle θs. The pinion shaft 26 is provided with a steering torque sensor 38 that detects the steering torque Ts. The electric motor 28 of the EPS device 12 is provided with a rotary encoder 28A that detects a rotation angle θm of a rotor (not shown).

The steering angle sensor 36 is provided in the steering transmission system 34 between the steering wheel 14 and the steering torque sensor 38. The steering angle sensor 36 functions as a first steering angle detection device that detects the first steering angle θs. The EPS·ECU 40 calculates the steering angle θp as the rotation angle of the pinion shaft 26 closer to the EPS device 12 than the steering torque sensor 38 based on the rotation angle θm detected by the rotary encoder 28A. Therefore, the rotary encoder 28A and the EPS·ECU 40 are provided in the steering transmission system 34 between the front wheels 16FL and 16FR and the steering torque sensor 38. The rotary encoder 28A and the EPS·ECU 40 function as a second steering angle detection device 37 that detects the second steering angle θp.

Although not shown in detail in FIG. 1, the steering torque sensor 38 detects the difference in rotation angle between a member on the steering wheel 14 side and a member on the EPS device 12 side with respect to the torsion bar which can be elastically torsionally deformed. To detect. That is, the steering torque sensor 38 detects the steering torque Ts as a value proportional to the relative rotation angle. The rotation angle of the member on the steering wheel 14 side with respect to the torsion bar is the same as the first steering angle θs. The rotation angle of the member on the EPS device 12 side with respect to the torsion bar is the same as the second steering angle θp.

Steering displacement and torque, that is, steering input, generated when the driver operates the steering wheel 14 are transmitted from the steering wheel to the front wheels 16FL and 16FR via the steering transmission system 34. Therefore, in terms of steering displacement and torque transmission direction, the first steering angle detection device (steering angle sensor 36) is located upstream with respect to the steering torque sensor 38. The second steering angle detection device 37 is located on the downstream side with respect to the steering torque sensor 38.

It is assumed that the first steering angle θs, the second steering angle θp, and the steering torque Ts take on positive values when the vehicle 102 turns to the left due to the driver's steering operation. Therefore, when the relative rotation of the member on the steering wheel 14 side and the member on the EPS device 12 side with respect to the torsion bar is a relative rotation corresponding to the left turning direction of the vehicle, the steering torque Ts has a positive value. Become. Further, as long as the control torque is applied to the steering transmission system 34 between the front wheels 16FL and 16FR and the steering torque sensor 38, the EPS device 12 may be a pinion assist type or a column assist type EPS device.

The EPS·ECU 40 controls the EPS device 12 in a manner known in the art based on the steering torque Ts and vehicle speed V detected by a driving operation sensor 80 and a vehicle condition sensor 90, which will be described later. Thereby, the EPS·ECU 40 controls the steering assist torque and reduces the steering burden on the driver. Further, the EPS. ECU 40 can steer the front wheels 16FL and 16FR as necessary by controlling the EPS device 12. Therefore, the EPS. ECU 40 and the EPS device 12 function as an automatic steering device that automatically steers the front wheels as necessary.

A camera sensor 52 and a radar sensor 54 are connected to the steering support ECU 50. The camera sensor 52 and the radar sensor 54 each include a plurality of camera devices and a plurality of radar devices. The camera sensor 52 and the radar sensor 54 function as a target information acquisition device that acquires information on at least a target ahead of the vehicle 102. Note that a Light Detection And Ranging (LiDAR) sensor may be used instead of or in addition to the radar sensor 54.

Further, a setting operation device 56 is connected to the steering support ECU 50. The setting operation device 56 is provided at a position to be operated by the driver. Although not shown in FIG. 1, in the embodiment, the setting operation device 56 includes an LTA switch, and the steering support ECU 50 executes LTA when the LTA switch is on. Note that the LTA switch may be omitted. Note that LTA means Lane Tracing Assist Control.

A drive device 62 that accelerates the vehicle 102 by applying driving force to drive wheels (not shown in FIG. 1) is connected to the drive ECU 60. The drive ECU 60 normally controls the drive device so that the drive force generated by the drive device 62 changes in accordance with the drive operation by the driver. When drive ECU 60 receives a command signal from steering support ECU 50, drive ECU 60 controls drive device 62 based on the command signal.

A brake device 72 is connected to the brake ECU 70, which applies braking force to wheels not shown in FIG. 1 to decelerate the vehicle 102 by braking. The brake ECU 70 normally controls the braking device so that the braking force generated by the brake device 72 changes according to the braking operation by the driver. Upon receiving the command signal from the steering support ECU 50, the brake ECU 70 performs automatic braking by controlling the brake device 72 based on the command signal.

Driving operation sensor 80 and vehicle condition sensor 90 are connected to CAN 104. Information detected by the driving operation sensor 80 and the vehicle condition sensor 90 (referred to as sensor information) is transmitted to the CAN 104. The driving operation sensor 80 includes a driving operation amount sensor and a braking operation amount sensor. The vehicle condition sensor 90 includes a vehicle speed sensor, a longitudinal acceleration sensor, a lateral acceleration sensor, a yaw rate sensor, and the like.

The steering support ECU 50 is a central control device that performs steering support control. In embodiments, the steering support ECU 50 cooperates with other ECUs to perform LTA. Steering support control such as LTA is performed with the prerequisite that the driver grips the steering wheel 14. Therefore, in the first to third embodiments described below, the steering support ECU 50 executes hand-off determination control that determines whether the driver is not gripping the steering wheel 14 but is letting it go. When the steering support ECU 50 determines to let go of the vehicle during execution of LTA, it gradually reduces the control amount of LTA and ends LTA. Note that LTA control is well known in the art and does not form the gist of the present disclosure, so a description thereof will be omitted.

First Embodiment

When the vehicle 102 turns left due to the driver's steering operation, that is, when the first steering angle θs changes to the left turning direction and torque in the left turning direction is input to the steering torque sensor 38 from the upstream side, The first steering angle θs and the steering torque Ts have positive values. Further, when the first steering angle θs changes to the right turning direction and a torque in the right turning direction is input to the steering torque sensor 38 from the upstream side, the first steering angle θs and the steering torque Ts are as follows. becomes a negative value. In other words, when the steering displacement and torque are input to the steering torque sensor 38 from the upstream side, the rate of change of the first steering angle θs and the steering torque Ts have the same sign.

On the other hand, when torque is input to the steering torque sensor 38 from the downstream side, a member of the steering torque sensor 38 is twisted in a direction opposite to a case where torque is input to the steering torque sensor from the upstream side, even in a situation in which the first steering angle θs is changed to any of the left turning direction and the right turning direction. Therefore, the rate of change of the first steering angle θs and the steering torque Ts have different signs when the steering input is from the downstream side.

Figure 3A:
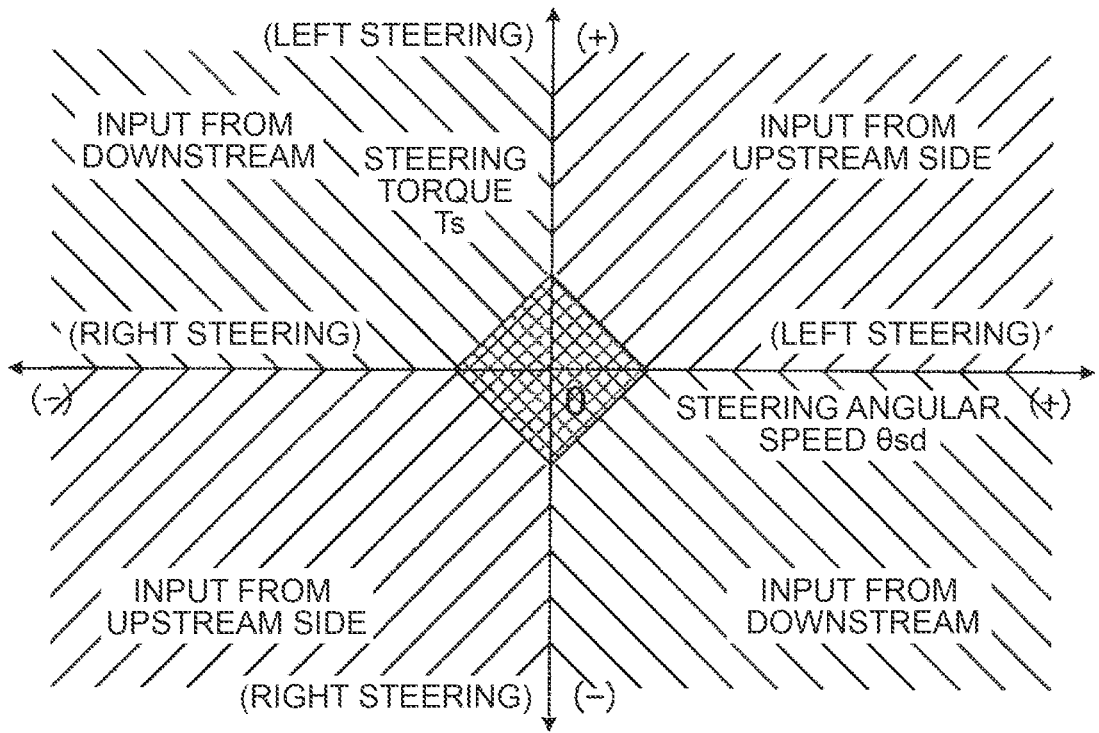
FIG. 3A shows the relationship between the first steering angular velocity $\theta sd$, the steering torque Ts, and the steering input direction.
Figure 3B:
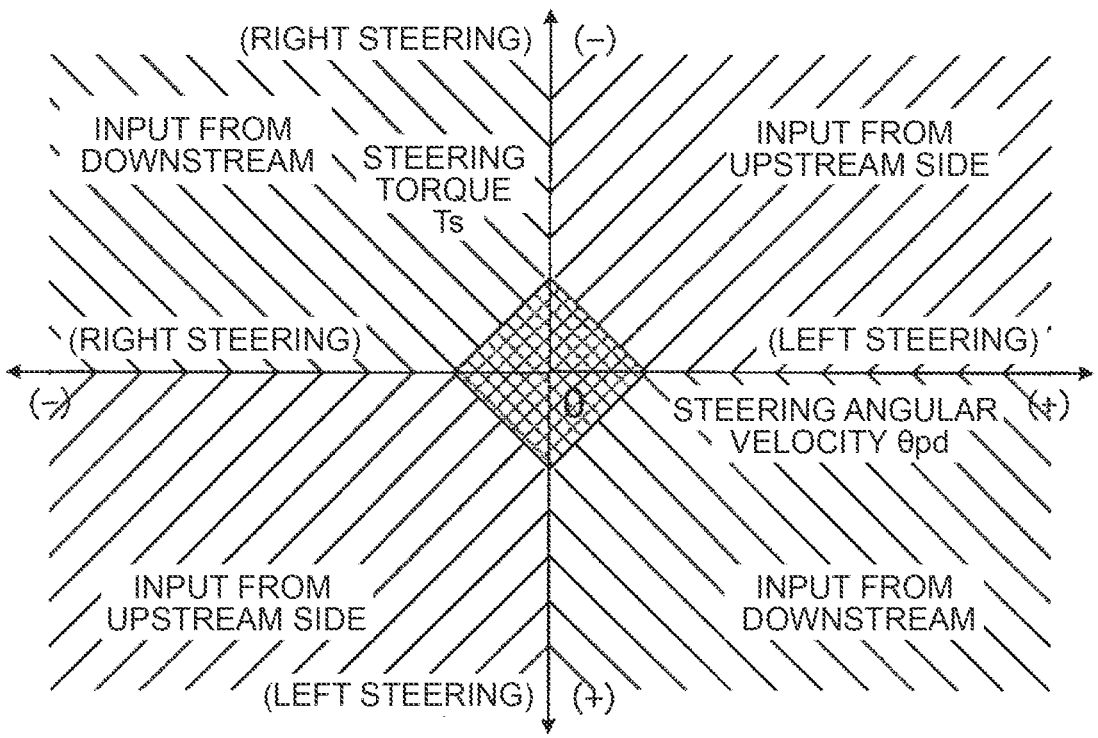
FIG. 3B is a diagram showing the relationship between the second steering angular velocity $\theta pd$, the steering torque Ts, and the steering input direction.

In the first embodiment, the ROM of the steering support ECU 50 stores the map shown in FIG. 3A. In FIG. 3A and FIG. 3B, which will be described later, the hatched area downward to the left is an area where it is determined that the steering input is from the upstream side. The hatched area downward to the right is an area where it is determined that the steering input is from the downstream side. Considering the offset of the steering torque sensor 38, etc., the cross-hatched area is an area where it cannot be determined whether the steering input is from the upstream side or the downstream side.

The CPU calculates the differential value of the first steering angle θs as the rate of change of the first steering angle θs, that is, the first steering angular velocity θsd. The CPU determines whether the steering input is from the upstream side by referring to the map based on the first steering angular velocity θsd and the steering torque Ts. The sign of the first steering angular velocity θsd represents the direction of change of the first steering angle θs. The sign of the steering torque Ts represents the direction of the steering torque. Further, when the CPU determines that the steering input is from the upstream side, the CPU sets the reference value Tsc for determining whether the driver has let go of the steering wheel to the standard value Tscs (a positive constant). On the other hand, when the CPU determines that the steering input is from the downstream side, the CPU sets the reference value Tsc to an increased value Tsch larger than the standard value Tscs.

Further, in the first embodiment, the ROM of the steering support ECU 50 stores a program for hand-off determination control corresponding to the flowchart shown in FIG. 2. The CPU executes hand-off determination control according to this program.

Letting Go Determination Control Routine of First Embodiment

The hand-off determination control according to the flowchart shown in FIG. 2 is performed repeatedly every hour by the CPU of the steering support ECU 50 when the LTA switch (not shown in FIG. 1) of the setting operation device 58 is on and LTA is executed. Note that this also applies to hand-off determination control in other embodiments described later. Further, when the hand-off determination control is started, the reference value Tsc for determining whether the driver has let go of the vehicle is set to the standard value Tscs.

First, in S110, the CPU calculates the first steering angular velocity θsd by calculating the differential value of the first steering angle θs.

In S120, the CPU determines whether the steering input is from the upstream side by referring to the map shown in FIG. 3A based on the first steering angular velocity θsd and the steering torque Ts. When the CPU makes an affirmative determination, in S130, the CPU sets the reference value Tsc for determining whether the driver has let go of the vehicle to the standard value Tscs. When the CPU makes a negative determination, the CPU advances the control to S140.

In S140, the CPU determines whether the steering input is from the downstream side by referring to the map shown in FIG. 3A based on the first steering angular velocity θsd and the steering torque Ts. When the CPU makes a negative determination, it maintains the reference value Tsc at the current value and temporarily ends this control. When the CPU makes an affirmative determination, the CPU advances the control to S150.

In S150, the CPU calculates the reference value Tsc by referring to the map shown in S150 of FIG. 2 based on the absolute value of the first steering angular velocity θsd. As shown in the figure, when the absolute value of the first steering angular velocity θsd is less than Tsc1 (positive constant), the reference value Tsc is set to the standard value Tscs. When the absolute value of the first steering angular velocity θsd is larger than Tsc2 (a positive constant larger than Tsc1), the reference value Tsc is set to the increased value Tsch. Furthermore, when the absolute value of the first steering angular velocity θsd is greater than or equal to Tsc1 and less than or equal to Tsc2, the reference value Tsc is such that the absolute value of the first steering angular velocity θsd is large in the range from the standard value Tscs to the increased value Tsch. It is set to be as large as possible.

In S400, by determining whether or not the determination that the steering torque Ts is less than the reference value Tsc has been made consecutively at least a reference number of times (a certain positive integer), the CPU determines whether the driver releases the hand from the steering wheel. When the CPU makes a negative determination, it determines in S410 that the driver is grasping the steering wheel, and continues the LTA control without interrupting it. On the other hand, when the CPU makes an affirmative determination, it determines in S420 that the driver has released the steering wheel, and interrupts the LTA control.

First Variant

When torque acts on the steering torque sensor 38, the second steering angle θp changes in the opposite direction to the first steering angle θs. Therefore, when the steering displacement and torque are input to the steering torque sensor 38 from the upstream side, the rate of change of the second steering angle θp and the steering torque Ts have different signs. Furthermore, when the steering input is from the downstream side, the rate of change of the second steering angle θp and the steering torque Ts have the same sign.

In the first modification, the ROM of the steering support ECU 50 stores the map shown in FIG. 3B. Although not shown in the figure, in S110, the CPU calculates the differential value of the second steering angle θp as the second steering angular velocity θpd. Further, in S120, the CPU determines whether the steering input is from the upstream side by referring to the map shown in FIG. 3B based on the second steering angular velocity θpd and the steering torque Ts. Further, in S140, the CPU determines whether the steering input is from the downstream side by referring to the map shown in FIG. 3B based on the second steering angular velocity θpd and the steering torque Ts.

According to the first embodiment and the first modification, based on the relationship between the signs of the first steering angular velocity θsd and the steering torque Ts, and the relationship between the signs of the second steering angular velocity θpd and the steering torque Ts, respectively, It is determined whether the steering input is from the downstream side. Therefore, it can be determined whether the steering input is from the downstream side based on the first steering angular velocity θsd, the second steering angular velocity θpd, and the steering torque Ts.

Second Embodiment

Figure 4A:
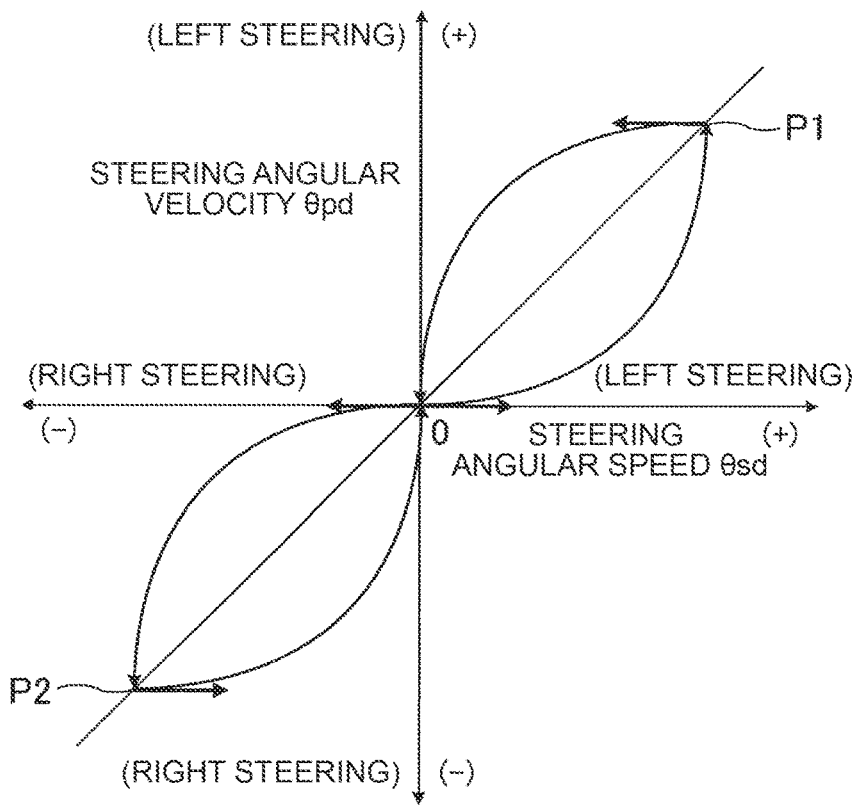
FIG. 4A is a diagram showing an example of changes in the first steering angular velocity $\theta sd$ and the second steering angular velocity $\theta pd$ when the steering input is from the upstream side.
Figure 4B:
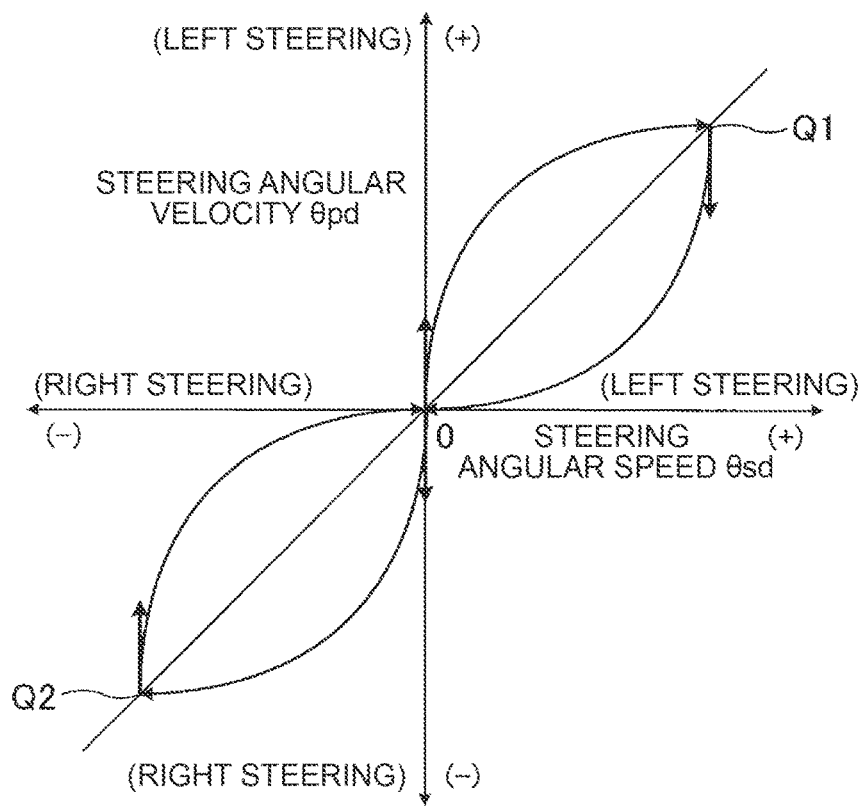
FIG. 4B is a diagram showing an example of changes in the first steering angular velocity $\theta sd$ and the second steering angular velocity $\theta pd$ when the steering input is from the downstream side.

FIG. 4A shows an example of changes in the first steering angular velocity θsd and the second steering angular velocity θpd when the driver performs a steering operation and the steering input is from the upstream side. FIG. 4B shows an example of changes in the first steering angular velocity θsd and the second steering angular velocity θpd when the steering input is from the downstream side.

When the steering input is from the upstream side, the steering displacement is transmitted from the upstream side to the downstream side, so the first steering angle θs changes faster than the second steering angle θp. As shown in FIG. 4A, near the start of the steering input (origin) and near points P1 and P2 where the magnitude of the steering angular velocity changes from increasing to decreasing, the first steering angular velocity θsd and the second steering angular velocity θpd are zero or very small values. However, after passing near the origin and near points P1 and P2, the first steering angular velocity θsd changes rapidly, but the change in the second steering angular velocity θpd is small.

On the other hand, when the steering input is from the downstream side, the steering displacement is transmitted from the downstream side to the upstream side, so the second steering angle θp changes faster than the first steering angle θs. As shown in FIG. 4B, in the vicinity of the origin and in the vicinity of points Q1 and Q2, the first steering angular velocity θsd and the second steering angular velocity θpd are 0 or very small values. However, after passing near the origin and near points P1 and P2, the second steering angular velocity θpd changes rapidly, but the change in the first steering angular velocity θsd is small.

In the second embodiment, the CPU calculates the second differential value of the first steering angle θs as the first steering angular acceleration θsdd, and calculates the second differential value of the second steering angle θp as the second steering angular acceleration θpdd. The sign of the first steering angular acceleration θsdd represents the direction of change in the first steering angular velocity θsd. The sign of the second steering angular acceleration θpdd represents the direction of change in the second steering angular velocity θpd. The CPU whether the steering input is from the upstream side based on the magnitudes of the first steering angular acceleration θsdd and the second steering angular acceleration θpdd after passing near the origin and near points P1 and P2. Determine whether or not.

Figure 5:
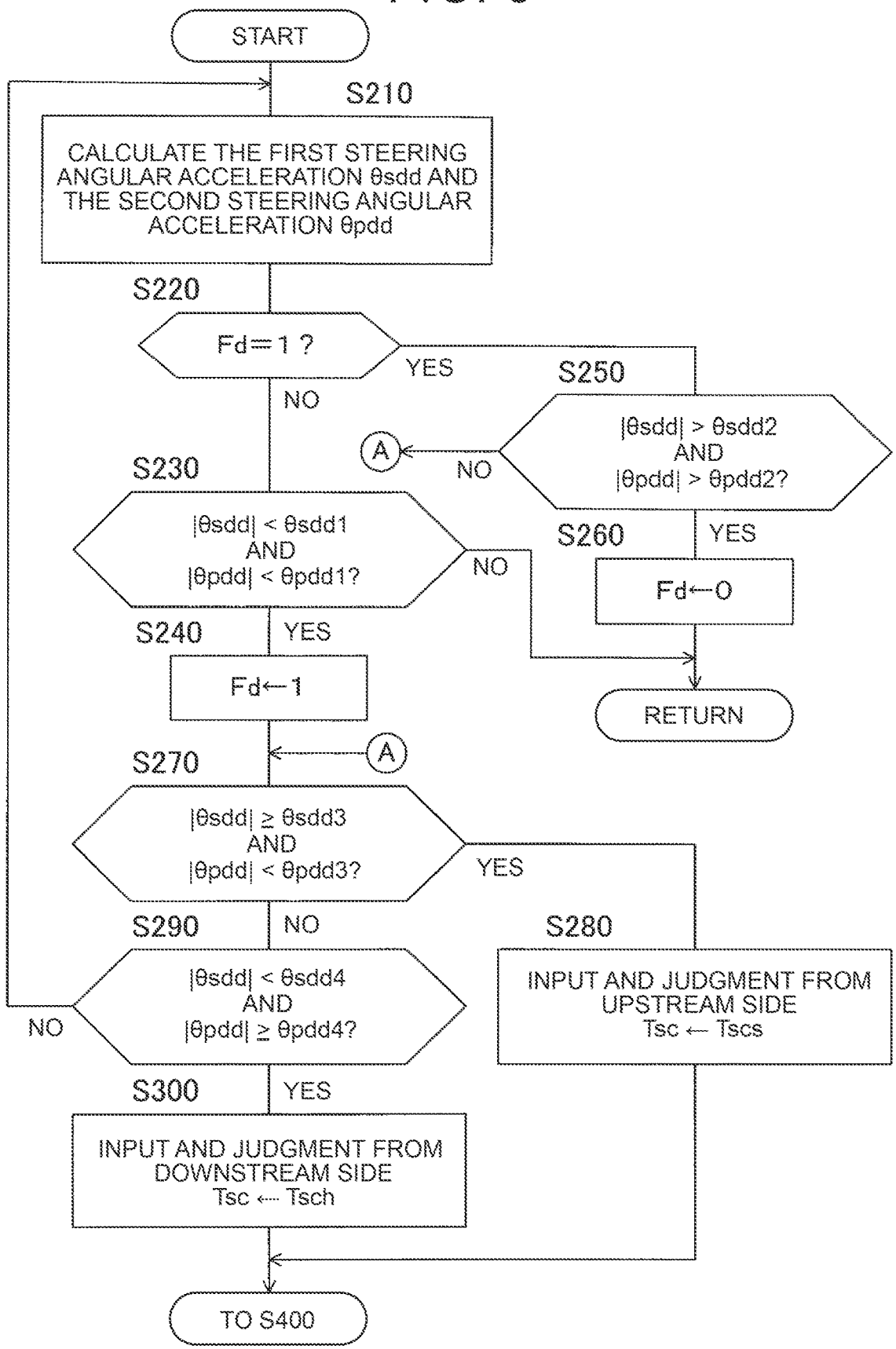
FIG. 5 is a flowchart showing the main part of the hand-holding determination control routine of the second embodiment.

Furthermore, in the second embodiment, the ROM of the steering support ECU 50 stores a program for hand-off determination control corresponding to the flowchart shown in FIG. 5. The CPU executes hand-off determination control according to this program. Note that the flag Fd is initialized to 0 when the hands-off determination control is started. Further, when the hand-off determination control is started, the reference value Tsc for determining whether the driver has let go of the vehicle is set to the standard value Tscs.

Letting go Determination Control Routine of Second Embodiment

First, in S210, the CPU calculates the first steering angular acceleration θsdd by calculating the second-order differential value of the first steering angle θs. Further, the CPU calculates the second steering angular acceleration θpdd by calculating the second-order differential value of the second steering angle θp.

In S220, the CPU determines whether the flag FD is one, that is, whether the situation is such that the steering input direction can be determined in S270 and S290, which will be described later. When the CPU makes an affirmative determination, it advances the control to S250. When the CPU makes a negative determination, the CPU advances the control to S230.

In S230, the CPU determines that the absolute value of the first steering angular acceleration θsdd is less than the first reference value θsdd1 (positive constant), and the absolute value of the second steering angular acceleration θpdd is equal to the first reference value θpdd1. (a positive whether). When the CPU makes an affirmative determination, it sets the flag Fd to 1 in S240. When the CPU makes a negative determination, it temporarily ends this control.

In S250, the CPU whether the absolute value of the first steering angular acceleration θsdd is larger than the second reference value θsdd2 and the absolute value of the second steering angular acceleration θpdd is larger than the second reference value θpdd2. Determine whether Note that the second reference values θsdd2 and θpdd2 are positive constants larger than the first reference values θsdd1 and θpdd1, respectively. When the CPU makes an affirmative determination, it resets the flag Fd to 0 in S260. When the CPU makes a negative determination, the CPU advances the control to S270.

In S270, the CPU determines that the absolute value of the first steering angular acceleration θsdd is greater than or equal to the third reference value θsdd3 (a positive constant greater than θsdd1), and the absolute value of the second steering angular acceleration θpdd is less than the third reference value θsdd3 (a positive constant). When the CPU makes a negative determination, the CPU advances this control to S290, and when it makes an affirmative determination, it advances this control to S280.

In S280, the CPU determines that the steering input is from the upstream side, and sets the reference value Tsc for determining whether the driver has let go of the steering wheel to the standard value Tscs.

In S290, the CPU determines that the absolute value of the first steering angular acceleration θsdd is less than the fourth reference value θsdd4 (positive constant), and the absolute value of the second steering angular acceleration θpdd is less than the fourth reference value θpdd4. (a positive constant larger than θpdd1) or whether is determined. When the CPU makes a negative determination, it maintains the reference value Tsc at the current value and temporarily ends this control, and when it makes an affirmative determination, it advances the present control to S300.

In S300, the CPU determines that the steering input is from the downstream side, and sets the reference value Tsc to the increased value Tsch. Note that, upon completing S280 or S300, the CPU advances this control to S400.

According to the second embodiment, it is determined whether the steering input is from the downstream side based on the magnitude of the absolute value of the first steering angular acceleration θsdd and the absolute value of the second steering angular acceleration θpdd. It will be judged. Therefore, it is possible to determine whether the steering input is from the downstream side based on the first steering angular acceleration θsdd and the second steering angular acceleration θpdd without requiring the steering torque Ts.

Third Embodiment

Figure 6A:
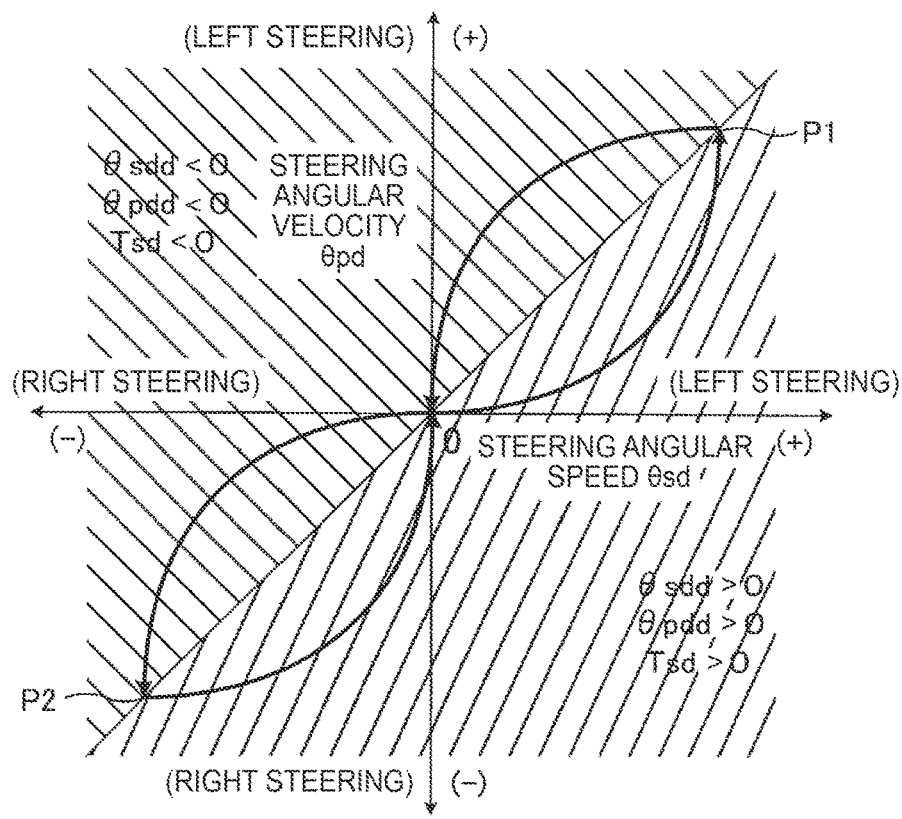
FIG. 6A is a diagram showing the relationship between the signs of the first steering angular acceleration $\theta sdd$ and the second steering angular acceleration $\theta pdd$ and the Tsd sign of the differential value of the steering torque Ts when the steering input is from the upstream side. be.
Figure 6B:
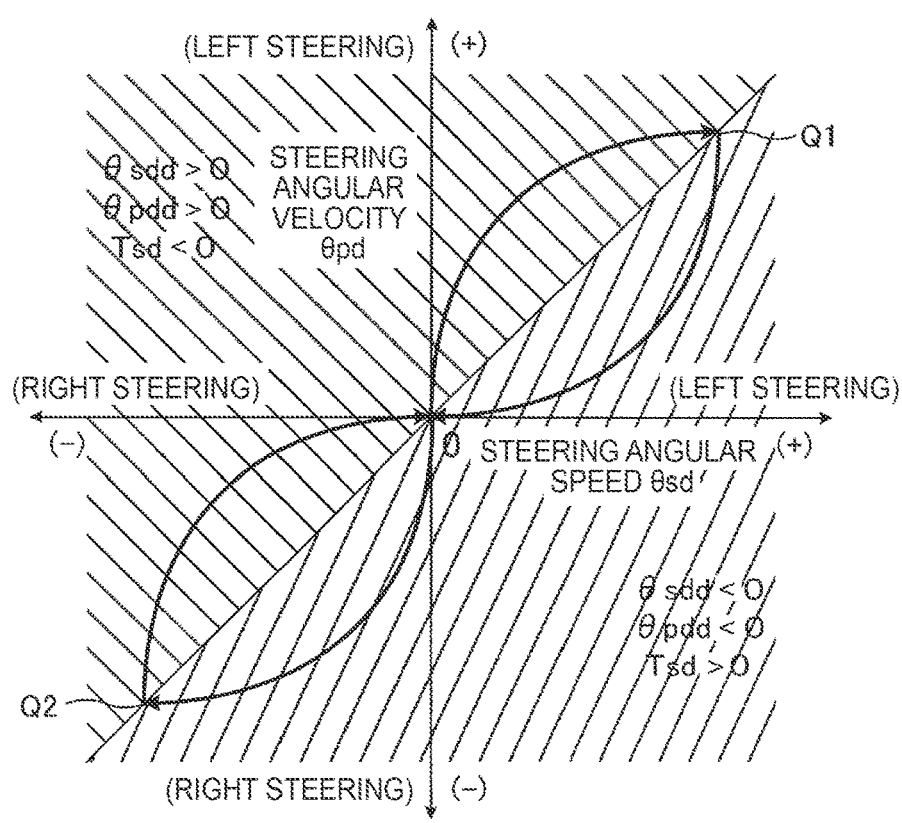
FIG. 6B is a diagram showing the relationship between the signs of the first steering angular acceleration $\theta sdd$ and the second steering angular acceleration $\theta pdd$ and the Tsd sign of the differential value of the steering torque Ts when the steering input is from the downstream side.

FIG. 6A shows the relationship of the signs of the first steering angular acceleration θsdd and the second steering angular acceleration θpdd and the sign of the differential value Tsd of the steering torque Ts when the driver performs a steering operation and the steering input is from the upstream side. FIG. 6B shows the relationship between the signs of the first steering angular acceleration θsdd and the second steering angular acceleration θpdd and the sign of the differential value Tsd of the steering torque Ts when the steering input is from the downstream side.

In the hatched area downward to the left in FIG. 6A, the first steering angular velocity θsd increases and the steering torque Ts also increases, so the first steering acceleration angular velocity θsdd and the differential value Tsd of the steering torque are positive. In addition, in the hatched area downward to the right in FIG. 6A, the second steering angular velocity θpd decreases and the steering torque Ts also decreases, so the second steering acceleration angular velocity θpdd and the differential value Tsd of the steering torque are negative. It is.

Therefore, the signs of the first steering acceleration angular velocity θsdd and the differential value Tsd of the steering torque, which indicate the change direction of the first steering angular velocity θsd and the steering torque Ts, respectively, are the same. Furthermore, the signs of the second steering acceleration angular velocity θpdd indicating the direction of change of the second steering angular velocity θpd and the differential value Tsd of the steering torque are also the same. Therefore, the product of the first steering acceleration angular velocity θsdd and the differential value Tsd of the steering torque and the product of the second steering acceleration angular velocity θpdd and the differential value Tsd of the steering torque are positive.

On the other hand, in the hatched area downward to the left in FIG. 6B, the first steering angular velocity θsd decreases, so the first steering acceleration angular velocity θsdd is negative. However, since the member of the torque sensor 38 is twisted in the same direction as in the hatched area downward to the left in FIG. 6A, the steering torque Ts increases and the differential value Tsd of the steering torque is positive. In addition, in the region of hatching downward to the right in FIG. 6B, the second steering angular velocity θpd increases, so the second steering acceleration angular velocity θpdd is positive. However, since the member of the torque sensor 38 is twisted in the same direction as in the hatched area downward to the right in FIG. 6A, the steering torque Ts decreases and the differential value Tsd of the steering torque is negative.

Therefore, the signs of the first steering jerk angular velocity θsdd and the differential value Tsd of the steering torque are different, and the signs of the second steering jerk angular velocity θpdd and the differential value Tsd of the steering torque are also different. Therefore, the product of the first steering acceleration angular velocity θsdd and the differential value Tsd of the steering torque and the product of the second steering acceleration angular velocity θpdd and the differential value Tsd of the steering torque are negative.

In the third embodiment, the CPU calculates the second steering angular acceleration θpdd and also calculates the differential value Tsd of the steering torque Ts. Further, the CPU determines whether the steering input is from the upstream side based on the sign of the product of the second steering angular acceleration θpdd and the differential value Tsd of the steering torque.

Further, in the third embodiment, the ROM of the steering support ECU 50 stores a program for hand-off determination control corresponding to the flowchart shown in FIG. 7. The CPU executes hand-off determination control according to this program. Note that when the hand-off determination control is started, the reference value Tsc for determining whether the driver has let go of the vehicle is set to the standard value Tscs.

Letting go Determination Control Routine of Third Embodiment

First, in S310, the CPU calculates the second steering angular acceleration θpdd by calculating the second-order differential value of the second steering angle θp. In S320, the CPU calculates the differential value Tsd of the steering torque Ts.

In S330, the CPU determines whether the product of the first steering angular acceleration θsdd and the differential value Tsd of the steering torque is equal to or greater than a reference value α (a positive constant close to 0). When the CPU makes a negative determination, the CPU advances this control to S350, and when it makes an affirmative determination, it advances this control to S340.

In S340, the CPU determines that the steering input is from the upstream side, and sets the reference value Tsc for determining whether the driver has let go of the steering wheel to the standard value Tscs.

In S350, the CPU determines whether the product of the second steering angular acceleration θpdd and the differential value Tsd of the steering torque is equal to or less than the reference value-α. When the CPU makes a negative determination, it maintains the reference value Tsc at the current value and temporarily ends this control, and when it makes an affirmative determination, it advances the present control to S360.

In S360, the CPU determines that the steering input is from the downstream side, and sets the reference value Tsc to the increased value Tsch. Note that, upon completing S340 or S360, the CPU advances the control to S400.

Second Variant

In S330, it is determined whether the product of the second steering angular acceleration θpd and the differential value Tsd of the steering torque is a positive value. In S350, it is determined whether of the second steering angular acceleration θpdd and the differential value Tsd of the steering torque is a negative value. That is, a in the third embodiment is set to 0.

Third Variant

If S350 in the third embodiment is omitted and a negative determination is made in S330, S360 is executed.

Fourth Modification

If S350 in the second modification is omitted and a negative determination is made in S330, S360 is executed.

According to the third embodiment and the second to fourth modifications, it is determined whether the steering input is from the downstream side based on the second steering angular acceleration θpd and the differential value Tsd of the steering torque. can do. Therefore, since the first steering angle θs is unnecessary, the steering angle sensor 36 can be omitted.

As can be seen from the above description, according to each embodiment and each modification, when it is determined that the steering input is from the downstream side, the reference value Tsc for determining the driver's hand-off is set to the standard value Tscs. The increment value Tsch is set to be larger than the increment value Tsch. Therefore, in a situation where the steering input is from the downstream side, the possibility of erroneously determining that the driver is not in the hands-off state can be reduced, while in a situation where the steering input is from the upstream side, the driver is not in the hands-off state. It is possible to reduce the possibility that it will be erroneously determined that the In particular, according to the embodiment, the EPS device 12 as a torque applying device includes an electric motor 28 equipped with a rotary encoder 28A, and the second steering angle θp is detected using the output of the rotary encoder. Therefore, in steering assist control such as LTA, the second steering angle θp can be detected by effectively utilizing the rotary encoder used to control the steering angles of the front wheels 16FL and 16FR. Therefore, there is no need for a steering angle sensor that detects the rotation angle of the pinion shaft 26, that is, the second steering angle θp, downstream of the steering torque sensor 38, for example.

The present disclosure has been described in detail above with respect to specific embodiments and modifications. However, it is obvious to those skilled in the art that the present disclosure is not limited to the above-described embodiments and modifications, and various other embodiments are possible within the scope of the present disclosure.

For example, in each of the above-described embodiments and modifications, the steering assist control is LTA, but any other control such as lane departure prevention control or lane change assist control that controls the lateral position of the vehicle with respect to the lane by automatic steering. It may be the steering assist control.

Further, in the first embodiment and the first modification, in S150, the reference value Tsc is calculated by referring to the map shown in S140 of FIG. 2 based on the absolute value of the first steering angular velocity θsd. However, in S150, the reference value Tsc may be set to the increased value Tsch regardless of the magnitude of the absolute value of the first steering angular velocity θsd.

Further, the second steering angular acceleration θpd in the third embodiment and the second to fourth modifications may be replaced with the first steering angular acceleration θsdd.

What is claimed is:

1. A steering support device including a torque applying device, a steering torque sensor, and a control unit, the torque applying device being configured to apply control torque to a steering transmission system between a steering wheel and a steered wheel, the steering torque sensor being provided in the steering transmission system between the steering wheel and the torque applying device, and the control unit being configured to determine that a driver is not gripping the steering wheel when torque detected by the steering torque sensor is less than a reference value, wherein the control unit is configured to set the reference value to a larger value when determination is made that the torque is input to the steering torque sensor from the steered wheel side than when determination is made that the torque is input to the steering torque sensor from the steering wheel side.

2. The steering support device according to claim 1, wherein:
the steering support device includes a steering angle detection device configured to detect a steering angle by detecting a rotation angle of a member of the steering transmission system; and
the control unit is configured to determine, based on a relationship between a direction of change in the steering angle detected by the steering angle detection device and a direction of the torque detected by the steering torque sensor, whether the torque is input to the steering torque sensor from the steered wheel side.

3. The steering support device according to claim 1, wherein:
the steering support device includes a first steering angle detection device that detects a steering angle between the steering wheel and the steering torque sensor, and a second steering angle detection device that detects a steering angle between the steered wheel and the steering torque sensor; and
the control unit is configured to determine, based on a relationship between a direction of change in the steering angle detected by the first steering angle detection device and a direction of change of the steering angle detected by the second steering angle detection device, whether the torque is input to the steering torque sensor from the steered wheel side.

4. The steering support device according to claim 1, wherein:
the steering support device includes a steering angle detection device configured to detect a steering angle by detecting a rotation angle of a member with one rotation direction of the member of the steering transmission system being positive;
the steering torque sensor is configured to detect torque with torque in one relative rotation direction being positive; and
the control unit is configured to determine, based on a product sign of a second-order differential value of the steering angle detected by the steering angle detection device and a differential value of the torque detected by the steering torque sensor, whether the torque is input to the steering torque sensor from the steered wheel side.

5. The steering support device according to claim 4, wherein:
the torque applying device includes an electric motor equipped with a rotary encoder; and
the steering angle detection device is configured to detect a steering angle using an output of the rotary encoder.

* * * * *